(12) United States Patent
Meketa et al.

(10) Patent No.: US 8,683,060 B2
(45) Date of Patent: Mar. 25, 2014

(54) ACCESSING MEDIA

(75) Inventors: Deneb Meketa, San Francisco, CA (US); Ethan Malasky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1852 days.

(21) Appl. No.: 11/685,704

(22) Filed: Mar. 13, 2007

(65) Prior Publication Data

US 2014/0041051 A1 Feb. 6, 2014

(51) Int. Cl.
*G06F 15/16* (2006.01)

(52) U.S. Cl.
USPC ........................................................ 709/229

(58) Field of Classification Search
USPC ........................................................ 709/229
See application file for complete search history.

(56) References Cited

U.S. PATENT DOCUMENTS

| 5,890,189 A | 3/1999 | Nozue et al. | |
| 6,687,745 B1 * | 2/2004 | Franco et al. | 709/219 |
| 2002/0066021 A1 * | 5/2002 | Chien et al. | 713/200 |
| 2007/0156695 A1 | 7/2007 | Lim | |
| 2007/0192834 A1 | 8/2007 | Song et al. | |
| 2008/0111822 A1 * | 5/2008 | Horowitz et al. | 345/530 |

* cited by examiner

*Primary Examiner* — Maceeh Anwari
(74) *Attorney, Agent, or Firm* — Schwegman Lundberg & Woessner, P.A.

(57) ABSTRACT

In general, one aspect of the subject matter described in this specification can be embodied in a method for receiving a request, from an application in an application execution environment, to play a media asset that has associated media information. The application has associated application information and is restricted to an isolation environment provided by the application execution environment. In response to the request, content of the media asset is provided to a component of a computer system for playing. Access by the application to the content of the media asset during the playing is restricted based on the media information and the application information.

20 Claims, 4 Drawing Sheets

ACCESSING MEDIA

BACKGROUND

The present disclosure relates to access to content of media among applications in an application execution environment.

An application execution environment is a virtualization environment that works in conjunction with the native services (e.g., an operating system) of a computing device to provide a consistent well-defined environment in which software applications can be loaded and executed. An application execution environment typically includes facilities such as memory management (e.g., garbage collection), standard libraries, media decoders, user interface frameworks and input-output interfaces. An application designed to run within an application execution environment can often be developed rapidly because developers can rely on the consistency of the application execution environment—even if the environment itself exists on widely varying systems. For example, applications can be specified using pre-defined syntactic structures such as a programming language (e.g., source code) or can include well defined virtual instructions (e.g., platform-independent bytecode, such as Macromedia Flash® bytecode). To run an application the application execution environment decodes the application into instructions and executes the instructions. Application execution environments are sometimes referred to as interpreters or virtual machines.

An application can be associated with an isolation environment which is provided by the application execution environment. The isolation environment prevents the application from accessing, modifying or interfering with another application in the same application execution environment.

While running, an application is typically allowed to identify a media asset (e.g., an image, a video or a sound) and to request that the application execution environment play the content of the media asset to a user. Another application running in the same application execution environment may be allowed to halt or alter the playing of the media item.

SUMMARY

This specification describes technologies relating to presenting and extracting the content of media assets in an application execution environment. In general, one aspect of the subject matter described in this specification can be embodied in a method that includes receiving a request from a first application in an application execution environment to play a media asset, which has associated media information. The first application has associated first information and is restricted to a first isolation environment provided by the application execution environment. In response to the request, content of the media asset is provided to a component of a computer system for playing to a user. Access by the first application to the content of the media asset during the playing is restricted based on the media information and the first information. Other embodiments of this aspect include corresponding systems, apparatus, and computer program products.

These and other embodiments can optionally include one or more of the following features. One or more media permissions associated with the media asset can be identified. The first application can be granted access to the content of the media asset based on the one or more media permissions and the first information. A second application in the application execution can be restricted from altering the playing of the content of the media asset based on the first information and on second information associated with the second application, where the second application is restricted to a second isolation environment provided by the application execution environment. One or more application permissions associated with the first application can be identified. The second application can be allowed to alter the playing of the media asset based on the one or more application permissions and the second information. The first information can be derived from a location on a network from which the first application is loaded. The second information can be derived from a location on a network from which the second application is loaded. The media information can be derived from a location on the network from which the media asset is loaded. The first information, the second information and the media information can each correspond to a respective network domain. The application execution environment can be invoked by a web browser.

The subject matter described in this specification can be embodied in a computer program product, encoded on a computer-readable medium, operable to cause data processing apparatus to perform the operations described above. In addition, the subject matter described in this specification can be embodied in a system including a processor, and a computer-readable medium coupled with the processor and having encoded thereon an application execution environment configured to load applications while running on the processor, where the application execution environment is configured to perform the operations described above.

Particular embodiments of the subject matter described in this specification can be implemented to realize one or more of the following advantages. Applications in an application execution environment can play any accessible media asset, yet the application can be prohibited from accessing content of the media asset. An application can be allowed to access content of any media asset that shares information (e.g., publishers, authors, owners) in common with the application. Access to the content of a media asset by an application can be controlled by permissions associated with the media asset. A first application, having initiated playing of a media asset, can be assured that the playing will be uninterrupted by any other application in the application execution environment. The first application, by virtue of having associated permissions or in-common associated information, can allow another application to interrupt media playback.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
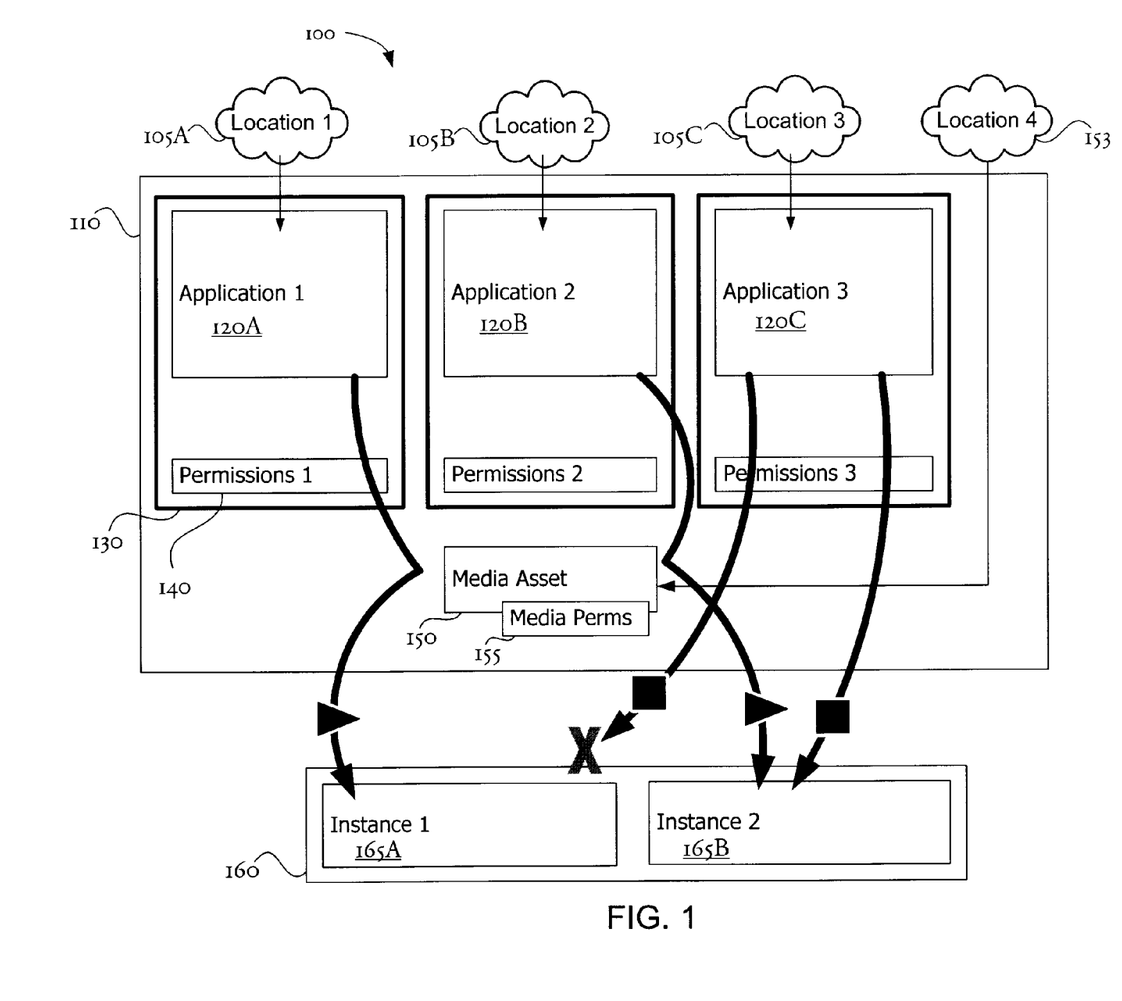
FIG. 1 is a block diagram of an example system for playing, altering playback and accessing content of media assets.

FIG. 1 is a block diagram of an example system 100 for playing, altering playback and accessing content of media assets. The system includes an application execution environment 110, which supports the execution of applications, such as applications 120A-C. The encoded representation of each application 120A-C may be accessible at respective locations 105A-C, which can be accessed and read by the application execution environment. The location can correspond to a particular file, a part of a file, multiple files, a record in a database, a segment of memory or any other finite, contiguous or noncontiguous portion of a computer-readable medium. The location of an application's encoded representation can correspond to a universal resource locator (URL). Generally, the application execution environment decodes an application's encoded representation into instructions and executes the instructions of the application. An application whose instructions are being executed by the application execution environment is said to be running within the application execution environment. The application execution environment 110 can be a plug-in to a web browser or a stand alone software program in computer system such as the system described below in reference to FIG. 4.

Each application 120A-C can be associated with a respective application isolation environment 130 that prevents an application from accessing, reading or otherwise interfering with other applications running outside of the given isolation environment. The application isolation environment 130 facilitates concurrent execution of multiple applications that are mutually distrusting. That is, the applications need neither cooperate (e.g., sharing of system resources) with nor expect cooperation from any other application in the application environment. In general, system resources are mediated by the application execution environment.

In general, separate applications can be loaded using a common isolation environment or using separate isolation environments. Such loading determinations can be made by the application execution environment based on classification information associated with applications (e.g., based on the network domain from which the application is loaded). For additional details regarding such application importing, see U.S. patent application Ser. No. 11/677,557, filed Feb. 21, 2007, and entitled "APPLICATION MANAGEMENT".

A media asset 150, which is accessible from a location 153, can be loaded by the application execution environment 110. A media asset includes playable media content such as images, sound, vector-based animations, and video. Generally, the content of a media asset refers to playable data that can be presented or played to a user. In some implementations a media asset can include other non-media content. For example, a media asset may additionally include an encoded application—however, the content of such an asset refers its playable data rather than its instructions.

When a media asset is played, the content of the media asset is provided to a player component 160 of the system 100. In general, the player component 160 can refer to a software component within the application execution environment (e.g., media decoders), support libraries (e.g., media codecs or firmware), services provided by an operating system (e.g., media player subsystems), a hardware component (e.g., a sound synthesizer, hardware-accelerated media decoder, video display system or other output devices) or some combination thereof.

The content of a media asset 150 is provided to the player component 160 in response to a request by an application running in the application execution environment 110. For example, a first application 120A can request that the media asset 150 be loaded, if not already loaded, and played. Generally, any application running in the application execution environment can request playback of a media asset. In some implementations, another application can request playback of a media asset concurrent with in-progress playback of the same media asset. Each request and playback of a media asset by a particular application is said to be an instance of media playback. For each instance of media playback, the application execution environment can identify both the media asset being played and the application that initiated the playback. Thus, the first instance 165A represents information associating the playback of content of the media asset 150 and the application 120A. When another request by a second application 120B for playback of the same media asset 150 is received, the playback is represented by the second instance 165B. Both media playbacks can occur concurrently. For example, the media asset may correspond to a video file wherein the video content is played by application 120A in a one window while the same content is played by application 120B in another window.

Generally, the content of media asset 150 is provided to the player component 160 by the application execution environment 110, which provides the media content on behalf of a requesting application. For example, audio content can be provided, by the application execution environment, to a sound sub-system for audio playback to the user. Video content can be decoded by a video sub-system such as a software or hardware video decoder and presented to the user in conjunction with a video display.

Although an application is able playback a media asset, access to the content of the media asset is restricted. The application execution environment generally allows an application to request access to the content of a media asset being played. The outcome of the request, and access to the content of the media asset, can be based on information that is associated with the media asset and the requested application.

Media and application information can identify information pertaining to the respective media asset or application. The information can include, for example, the publisher, author or owner of a media asset or application. In some implementations, the information includes the location from where the media asset or application was loaded. Information of the media asset and the application can be compared to determine whether some of the information matches. For example, if the application and the media asset are associated with a matching publisher, author or owner, then the application can be allowed to access the content of the media asset. Alternatively, an application is allowed to access the content of a playing media asset based on permissions 155 associated with the media asset 150. Thus, for example, the applications 120A-C can cause the content of any media asset, for example audio streams, to be played without restriction, however the applications are still prevented from accessing the content of the playing media assets. An audio visualization application, which uses audio content to generate its visualization, can request and be given access to the playing audio stream. Other examples include runtime image post-processing, screen capture (e.g., for screenshots, troubleshooting or user-interaction analysis), or facilitating custom programmatic content filters. Access to the content is mediated by the application execution environment and based on the permissions associated with the media asset.

The application execution environment can also restrict other applications from altering the playing of the content of a media asset. For example, application 120C can request that the playing of the media asset 150 be altered. An application can be allowed to alter the playback of a media asset based on information associated with the application that initiated playback of the playing media asset. For example, if application 120B and application 120C are published by the same publisher, then application 120C can be allowed to alter the playback of the instance 165B.

An application is able to alter playback of a media asset based on permissions 140 associated with the application that requested playback of the playing media asset. For example, permissions associated with application 120B are used to allow application 120C to alter the presentations of media played by application 120B. Thus, for example, to attract the attention of a user, an application may be able to pause or mute the playback of an audio stream currently being played on behalf of another application. Whether the application is able to interrupt or affect playback of a media asset is determined by the application execution environment and can be based on the permissions associated with the application that initiated playback of the audio stream. Other examples include global volume control, preempting playback of one media so that another media playback can be heard, or enforcing a time limit on media presentation.

Figure 2:
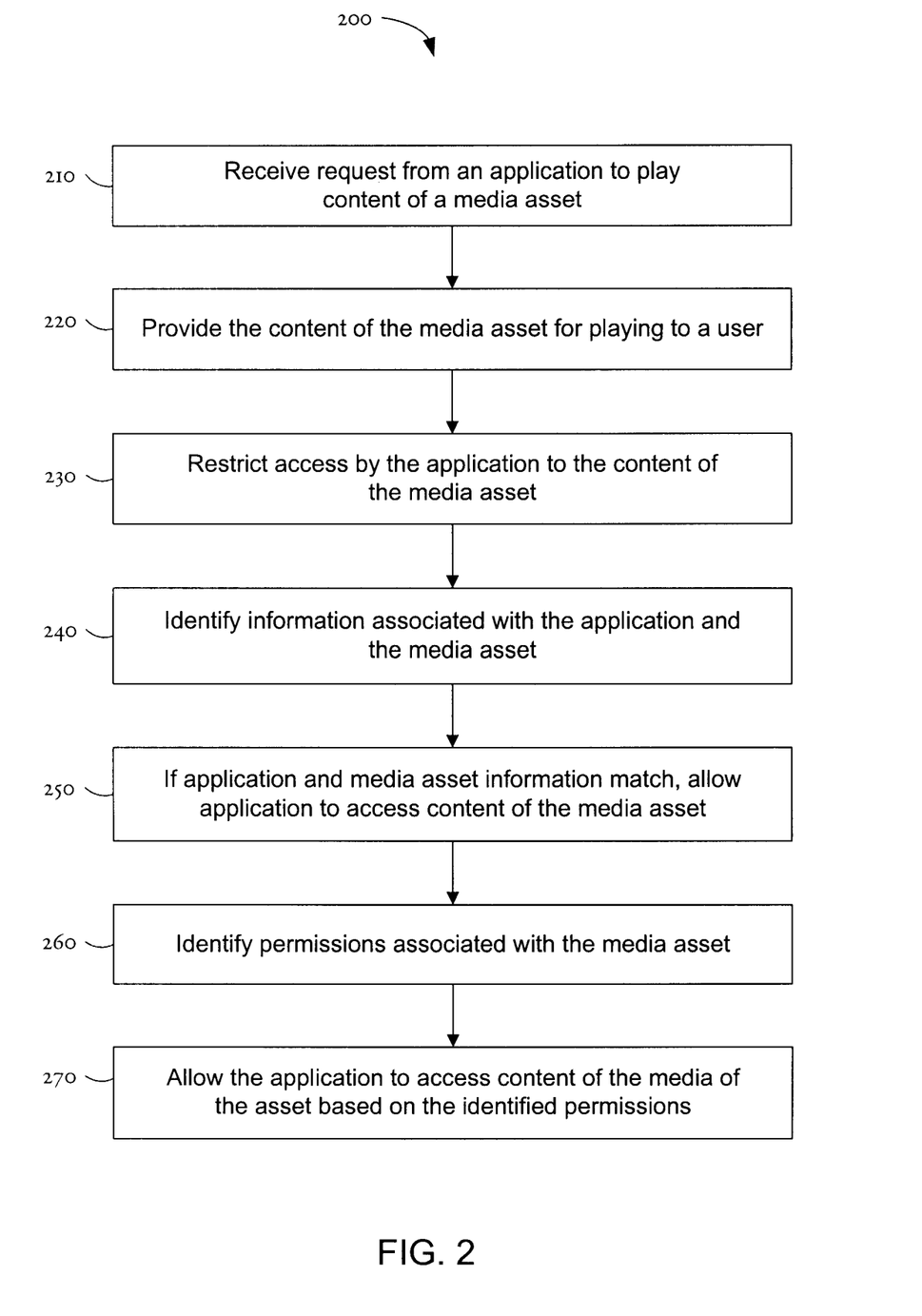
FIG. 2 is a flow diagram of an example process for restricting extraction of media asset content.

FIG. 2 is a flow diagram of a process 200 for restricting extraction of media asset content. A request can be received 210 from an application in an application environment. The request can identify the location of a media asset or provide information that the application execution environment can use to identify the location. Generally, the application execution environment loads the media asset by reading information accessible at a location identified by either the application execution environment or the requesting application. In some implementations, reading the media asset includes downloading the media asset from a location on a network.

In some implementations, any application is allowed to playback any media that is accessible to the application execution environment, excepting conventional security considerations. For example, conventional security considerations may require that an application execution environment only access media assets from a network location, or a particular area of a locally attached memory device rather than having access to any media asset stored on any readable medium accessible from the computer system. In general, as long as a media asset is accessible to the application execution environment and the media asset can be loaded on behalf of the application, it is playable by an application identifying the media asset (without considering, for the moment, associated information or permissions as described elsewhere herein).

The content of the media asset is provided 220 to a player component. Generally, the provision of media content to the player component is facilitated by the application execution environment in response to the application's playback request. Extraction of the content of the media asset by the application is restricted 230 so that, in general, the content of a media asset is not directly accessible by any of the applications in the application execution environment without proper security checks (e.g., comparing information or checking permissions). In other words, an application can identify a media asset and request playback the media asset's content, causing the content to be played at the request of the application even though the application has not cleared a security check for access to the content itself, and the application is prevented from directly reading the content of the media asset.

In general, access to the content of a media asset is restricted such that an application in the application execution environment cannot read the content of the media asset unless it has been authorized to do so. The restriction is governed by information associated with the application and with the media asset. Both the application and the media asset can have a variety of associated information, including authorship, publishing and ownership information. In some implementations, the information includes a cryptographic key that can be used to identifying information associated with a media asset or an application. The associated information can be included with the media asset, or an application (e.g., with an application's encoded representation), or alternatively, the associated information can be derived from one or more other sources. For example, an information database can be queried to identify information pertaining to a particular application or media asset.

Information associated with an application and with a media asset can be identified 240 and matched to determine whether 250 the application is allowed to extract content of the media being played. In some implementations, if the application and the media asset share a common owner or publisher, the application can be allowed to extract the content of the media asset. In other implementations, if location information associated with the application and media asset match, or partially match, then the application can be allowed to access content of the media. For example, if the media asset is loaded from 'http://xyz.tld/media.flv' and the encoded representation of the application is loaded from 'http://xyz.tld/app1.swf', then both locations are deemed a match because both share a common network domain, namely 'xyz.tld'. For additional details regarding policy files see U.S. application Ser. No. 11/213,184 filed Aug. 25, 2005, and entitled "SYSTEM AND METHOD FOR CONTROLLING ACCESS TO FILES".

Permissions associated with the media asset can also be identified 260. The permissions of a media asset can identify particular applications or classes of application (e.g., applications published by a particular publisher or whose encoded representation is accessible at a particular location). Based on the permissions associated with the media asset, the application can be allowed 270 to access content of the media asset.

In general, the permissions associated with a media asset can identify particular actions that an application is permitted to perform such as loading, extracting, starting, stopping, pausing and filtering. In some implementations, the permissions of an asset are used to determine whether the application is allowed to even request that the media asset be loaded into the application execution environment. If, for example, an application is not permitted to load the media asset, then the application would not be able to request any subsequent actions (e.g., playback or extraction).

If the application is allowed to access content of the media asset, then content, or a portion thereof, of the media asset can be provided to the application upon request. The application execution environment can provide an interface, such as an application programming interface (API), by which an application is able to request extraction of content of a media asset being played at the time of the request.

Figure 3:
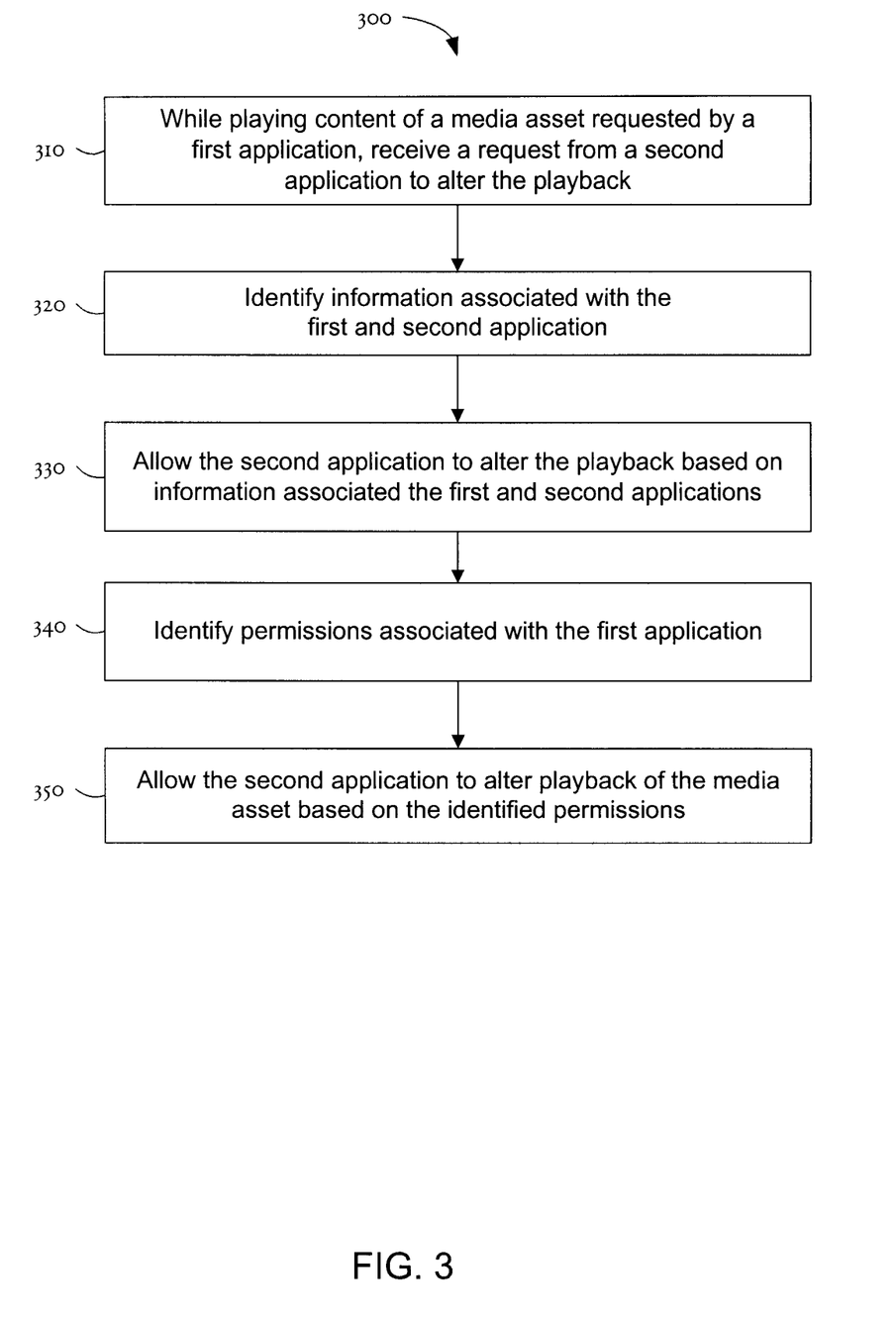
FIG. 3 is a flow diagram of an example process for restricting alteration of playback of content of a media asset.

FIG. 3 is a flow diagram of a process 300 for restricting alteration of playback of content of a media asset. To effect alteration of playback, the playback of media asset content is presumed to be underway, typically at the request of a first application running in the application execution environment. A request is received 310 from a second application in the same application execution environment to alter the playback of content of the media asset. Altering the playback of a media asset can include stopping playback, filtering playback (e.g., slow-motion, blur, pixilation, reverberation or any media transformation) or any other action that affects the presentation of the media content (e.g., altering volume level). Generally, an application is restricted from altering the playback of content of the media asset when the playback was requested by another application.

When a playback alteration request is received, information associated with both the first and second application can be identified 320. As described above, this associated information can identify a publisher, author, owner or other information related to each respective application.

The second application is allowed 330 to alter playback if information associated with the first application can be matched with information associated with the second application. For example, if both the first and second applications are associated with the same publisher or have been loaded from the same location, the first application is allowed to alter the media playback initiated by the second application.

Permissions associated with the first application can be identified 340. The permissions can identify other applications which are allowed to interrupt media playback. In particular, the permissions can identify actions that an application is allowed to perform. These actions can include altering the playback of a media asset. The permissions can, for example, identify, with varying levels of granularity, the extent to which an application can alter playback. For example, a permission can specify alteration that includes stopping and pausing, but specify that alteration does not include playing the content of a media asset through a filter. Another permission can specify alteration of playback volume within a particular range. The permissions can also identify applications to which the permission apply in varying granularity. For example, an application can be identified by any associated information including application identifiers, publisher or author identifier, secured certification, or URLs referring to potential locations of the application In some implementations, permissions associated with an application or a media asset can be specified in a policy file associated with an application. The location of the policy file can be based on pre-determined values such as a default-location or based on a database of policy-file application associations. In some implementations, the location of the policy file is derived from the location of the encoded representation of an application. For example, the location of the encoded representation of an application may specify a particular file on a server. The location can be specified in a URL such as 'http://domain.tld/path/file.swt'. From this URL, a location of the policy file can be derived based on a pre-defined convention. For example, an associated policy file can be located at 'http://domain.tld/path/file.policy' or 'http://domain.tld/path/security.policy'. In some implementations, multiple potential policy file locations can be derived and each location accessed in sequence.

The request made by the second application to alter playback initiated by the first application, can be allowed 350 based on the identified permissions associated with the first application. If the request is allowed, then a permission associated with the first application permits the second application to alter playback in the requested fashion.

For example, referring to FIG. 1, the third application 120C can request that the playing of the media asset 150 in both the first instance 165A and second instance 165B be stopped. The third application 120C is permitted to halt or alter the playing in the second instance 165B because the third application 120C and the second application 120B share common information or because the permissions associated with the second application 120B identify the third application 120C and permit the requested action. However, the third application 120C is not permitted to alter playing of the first instance initiated by the first application 120A, either because application information associated with both applications do not match or because permissions associated with application 120A do not allow the requested action.

In general, an instance of playing content is essentially associated with both media information, associated with the media asset, and application information, associated with the application that requested playback. The media information and the application information need not be same. For example, the media asset can have one owner while the application requesting playback has a completely different owner. Fulfillment of a request for extraction of the content of the playing media depends on the media information and information associated with the requesting application, while fulfillment of a request to alter the playback depends on the application information and information associated with the requesting application.

Figure 4:
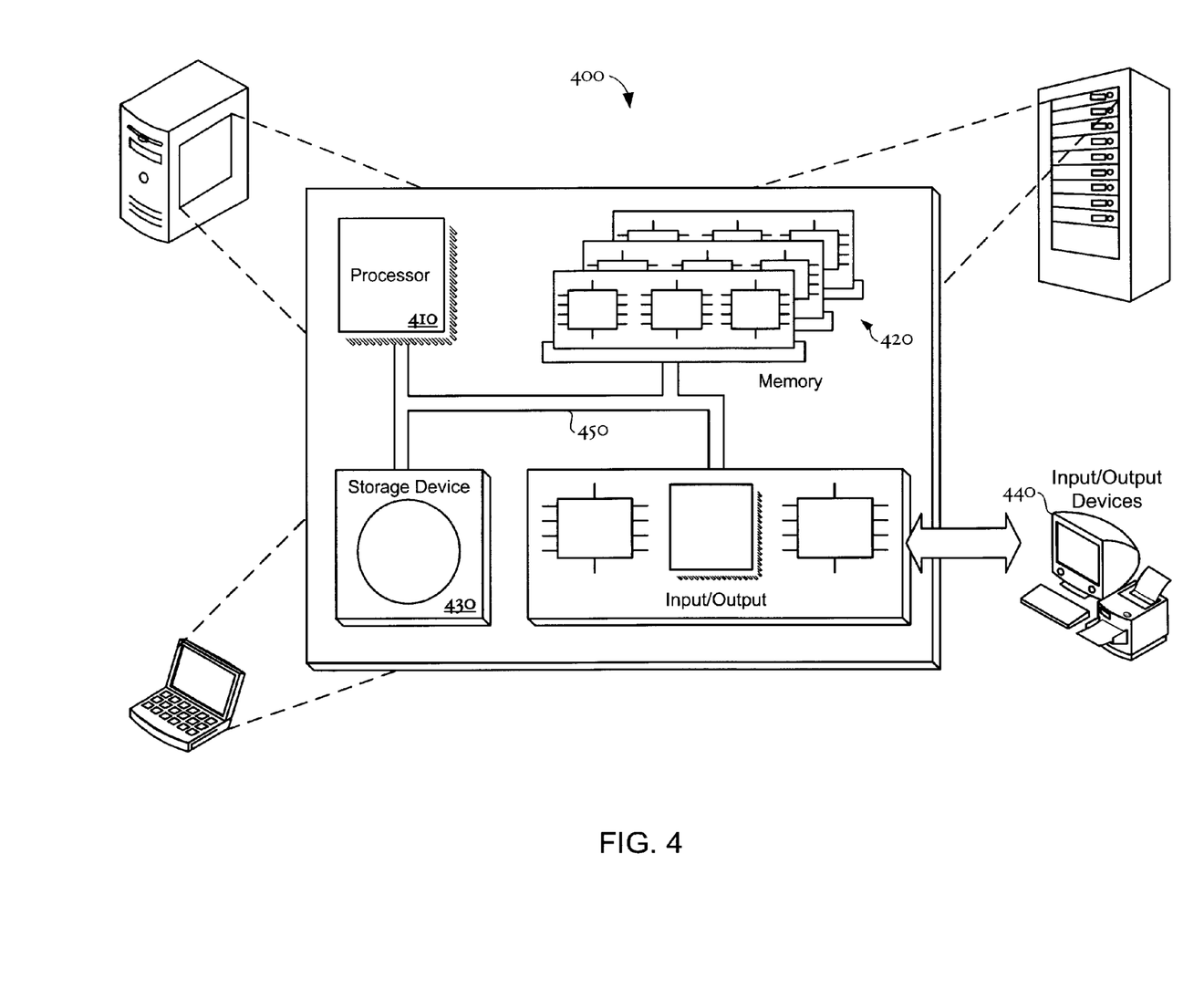
FIG. 4 is a diagram of a generic computer system.

FIG. 4 is a diagram of a generic computer system 400. An application execution environment can be run on the system 400, which will, in general, mediate access between applications running in the application execution environment and the parts of the system 400. The system 400 can be used for practicing operations described in association with the process 200 or the process 300. The system 400 can include a processor 410, a memory 420, a storage device 430, and an input/output device 440. Each of the components 410, 420, 430, and 440 are interconnected using a system bus 450. The processor 410 is capable of processing instructions for execution within the system 400. Such executed instructions can implement one or more components of the system 100 described in reference to FIG. 1, for example. In one implementation, the processor 410 is a single-threaded processor. In another implementation, the processor 410 is a multi threaded processor. The processor 410 is capable of processing instructions stored in the memory 420 or on the storage device 430 to display graphical information for a user interface on the input/output device 440.

The memory 420 is a computer readable medium such as volatile or non volatile that stores information within the system 400. The memory 420 can store data structures representing history trees and reduced history trees for complex solids, for example. The storage device 430 is capable of providing persistent storage for the system 400. The storage device 430 may be a floppy disk device, a hard disk device, an optical disk device, or a tape device, or other suitable persistent storage means. The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving a request, from a first application in an application execution environment, to play a media asset having associated media information, the first application having associated first information and being restricted to a first isolation environment provided by the application execution environment, the first isolation environment preventing the first application from accessing another application in the application execution environment;
   providing, in response to the request, content of the media asset to a component of a computer system associated with the first application for playing;
   allowing the first application to control the playing of the media asset; and restricting access by the first application to the content of the media asset during the playing by the component of the computer system based on the media information and the first information.

2. The method of claim 1, further comprising:
identifying one or more permissions associated with the media asset; and
granting the first application access to the content of the media asset based on the one or more permissions and the first information.

3. The method of claim 1, further comprising:
restricting a second application in the application execution from altering the playing of the content of the media asset based on the first information and on second information associated with the second application, the second application being restricted to a second isolation environment provided by the application execution environment.

4. The method of claim 3, further comprising:
identifying one or more permissions associated with the first application; and
allowing the second application to alter the playing of the media asset based on the one or more permissions and the second information.

5. The method of claim 3, further comprising:
deriving the first information from a location on a network from which the first application is loaded;
deriving the second information from a location on a network from which the second application is loaded; and
deriving the media information from a location on the network from which the media asset is loaded.

6. The method of claim 1, further comprising:
deriving the first information from a location on a network from which the first application is loaded; and
deriving the media information from a location on the network from which the media asset is loaded.

7. A non-transitory computer readable medium encoding a computer program product that when run by a data processing apparatus causes the data processing apparatus to perform operations comprising:
receiving a request, from a first application in an application execution environment, to play a media asset having associated media information, the first application having associated first information and being restricted to a first isolation environment provided by the application execution environment, the first isolation environment preventing the first application from accessing another application in the application execution environment;
providing, in response to the request, content of the media asset to a component of a computer system associated with the first application for playing;
allowing the first application to control the playing of the media asset; and
restricting access by the first application to the content of the media asset during the playing by the component of the computer system based on the media information and the first information.

8. The computer program product of claim 7, the operations comprising:
identifying one or more permissions associated with the media asset; and
granting the first application access to the content of the media asset based on the one or more permissions and the first information.

9. The computer program product of claim 7, the operations comprising:
restricting a second application in the application execution from altering the playing of the content of the media asset based on the first information and on second information associated with the second application, the second application being restricted to a second isolation environment provided by the application execution environment.

10. The computer program product of claim 9, the operations comprising:
identifying one or more permissions associated with the first application; and
allowing the second application to alter the playing of the media asset based on the one or more permissions and the second information.

11. The computer program product of claim 9, the operations comprising:
deriving the first information from a location on a network from which the first application is loaded;
deriving the second information from a location on a network from which the second application is loaded; and
deriving the media information from a location on the network from which the media asset is loaded.

12. The computer program product of claim 7, the operations comprising:
deriving the first information from a location on a network from which the first application is loaded; and
deriving the media information from a location on the network from which the media asset is loaded.

13. The computer program product of claim 7, where:
the application execution environment is invoked by a web browser.

14. A system comprising:
a processor;
a computer-readable medium coupled with the processor and having encoded thereon an application execution environment that loads applications when run on the processor,
the application execution environment programmed to receive a request, from a first application in an application execution environment, to play a media asset having associated media information, the first application having associated first information and being restricted to a first isolation environment provided by the application execution environment, the first isolation environment preventing the first application from accessing another application in the application execution environment;
the application execution environment programmed to provide, in response to the request, content of the media asset to a component of a computer system associated with the first application for playing;
the application execution environment programmed to allow the first application to control the playing of the media asset; and
the application execution environment programmed to restrict access by the first application to the content of the media asset during the playing by the component of the computer system based on the media information and the first information.

15. The system of claim 14, application execution environment further programmed to:
identify one or more permissions associated with the media asset; and
grant the first application access to the content of the media asset based on the one or more permissions and the first information.

16. The system of claim 14, application execution environment further programmed to:

restrict a second application in the application execution from altering the playing of the content of the media asset based on the first information and on second information associated with the second application, the second application being restricted to a second isolation environment provided by the application execution environment.

17. The system of claim 16, application execution environment further programmed to:
   identify one or more permissions associated with the first application; and
   allow the second application to alter the playing of the media asset based on the one or more permissions and the second information.

18. The system of claim 16, application execution environment further programmed to:
   derive the first information from a location on a network from which the first application is loaded;
   derive the second information from a location on a network from which the second application is loaded; and
   derive the media information from a location on the network from which the media asset is loaded.

19. The system of claim 14, application execution environment further programmed to:
   derive the first information from a location on a network from which the first application is loaded; and
   derive the media information from a location on the network from which the media asset is loaded.

20. The system of claim 19, where the first information and the media information correspond to a respective network domain.

* * * * *